(12) United States Patent
Ushiro

(10) Patent No.: US 11,010,109 B2
(45) Date of Patent: May 18, 2021

(54) INFORMATION PROCESSING APPARATUS AND NON-TRANSITORY COMPUTER READABLE MEDIUM FOR EVALUATING PAGE IMAGES USING ATTRIBUTE INFORMATION

(71) Applicant: FUJI XEROX CO., LTD., Tokyo (JP)

(72) Inventor: Takemichi Ushiro, Kanagawa (JP)

(73) Assignee: FUJI XEROX CO., LTD.., Tokyo (JP)

( * ) Notice: Subject to any disclaimer, the term of this patent is extended or adjusted under 35 U.S.C. 154(b) by 0 days.

(21) Appl. No.: 16/745,450

(22) Filed: Jan. 17, 2020

(65) Prior Publication Data

US 2021/0004184 A1 Jan. 7, 2021

(30) Foreign Application Priority Data

Jul. 5, 2019 (JP) .............................. JP2019-126033

(51) Int. Cl.
*G06F 3/12* (2006.01)

(52) U.S. Cl.
CPC .......... *G06F 3/1208* (2013.01); *G06F 3/1256* (2013.01)

(58) Field of Classification Search
None
See application file for complete search history.

(56) References Cited

U.S. PATENT DOCUMENTS

| | | | | |
|---|---|---|---|---|
| 2004/0196499 | A1* | 10/2004 | Livingston | G06F 3/1205 358/1.15 |
| 2012/0072471 | A1* | 3/2012 | Yoshida | H04N 1/00214 707/812 |
| 2013/0246915 | A1* | 9/2013 | Ishibashi | G06F 3/1284 715/274 |
| 2017/0177285 | A1* | 6/2017 | Fujiwara | G06F 3/1212 |
| 2017/0255430 | A1* | 9/2017 | Lahey | G06F 3/1262 |

FOREIGN PATENT DOCUMENTS

| | | |
|---|---|---|
| JP | 2009-301307 A | 12/2009 |
| JP | 2009301307 A * | 12/2009 |

* cited by examiner

*Primary Examiner* — Henok Shiferaw
(74) *Attorney, Agent, or Firm* — Oliff PLC

(57) ABSTRACT

An information processing apparatus includes: a reception section that receives print data including plural page images and receives data on what type the print data is for selecting attribute information with a degree of importance set for each attribute indicating a feature of the page image; an acquisition section that acquires the attribute information according to the type of the print data; a setting section that sets an evaluation value for each of the page images included in the print data by using the acquired attribute information; and a control section that performs a control to display previews of the page images according to the evaluation values.

16 Claims, 12 Drawing Sheets

FIG. 3

| TYPE NUMBER | TYPE | INITIAL KEY ATTRIBUTE | INITIAL DEGREE OF IMPORTANCE | | | | |
|---|---|---|---|---|---|---|---|
| | | | PAGE FOR CHAPTER DIVISION | PAPER SIZE | PAPER TYPE | COLOR SETTING | IMAGE RATIO |
| 1 | INVOICE | PAPER TYPE | 20 | 20 | 30 | 5 | 1 |
| 2 | DELIVERY NOTE | PAGE FOR CHAPTER DIVISION | 30 | 20 | 10 | 10 | 1 |
| 3 | RECEIPT | PAPER SIZE | 1 | 40 | 10 | 1 | 1 |
| 4 | ADVERTISING FLYER | IMAGE RATIO | 1 | 1 | 10 | 30 | 50 |

FIG. 4

| PROCESSING ID | PRINT DATA FILE NAME | TYPE NUMBER | CHANGED KEY ATTRIBUTE | CHANGED DEGREE OF IMPORTANCE ||||| PREVIEW DISPLAY NUMBER |
|---|---|---|---|---|---|---|---|---|---|
| | | | | PAGE FOR CHAPTER DIVISION | PAPER SIZE | PAPER TYPE | COLOR SETTING | IMAGE RATIO | |
| 1111 | WW COMPANY INVOICE | 1 | PAGE FOR CHAPTER DIVISION | 40 | 20 | 30 | 5 | 1 | 5 |
| 2222 | XX DELIVERY NOTE DATA | 2 | PAPER TYPE | 30 | 20 | 40 | 10 | 1 | 4 |
| 3333 | YY STORE RECEIPT | 3 | PAPER SIZE | 1 | 40 | 10 | 1 | 1 | 2 |
| 4444 | ZZ PRODUCT ADVERTISING FLYER | 4 | COLOR SETTING | 1 | 1 | 10 | 60 | 50 | 6 |

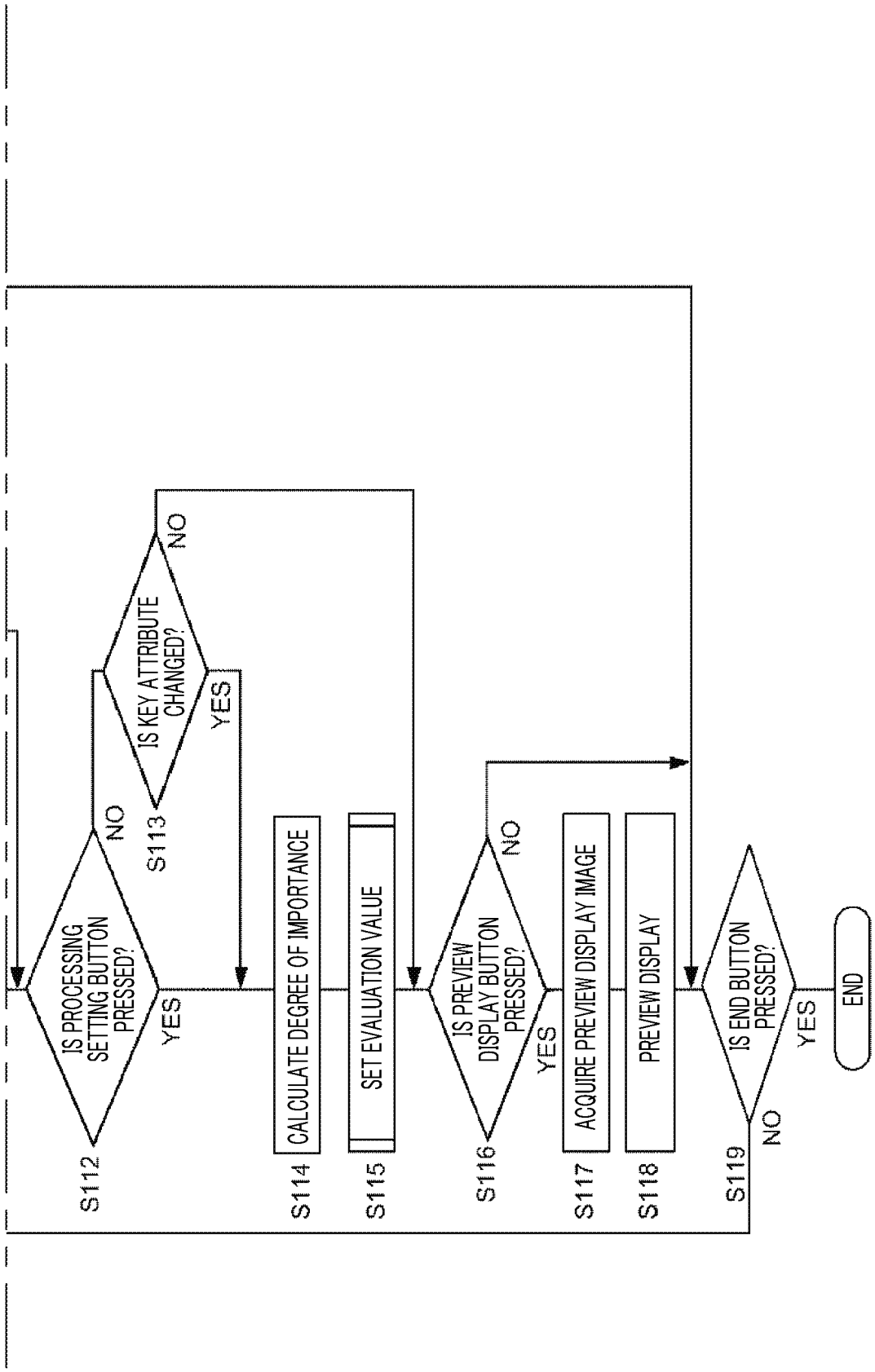

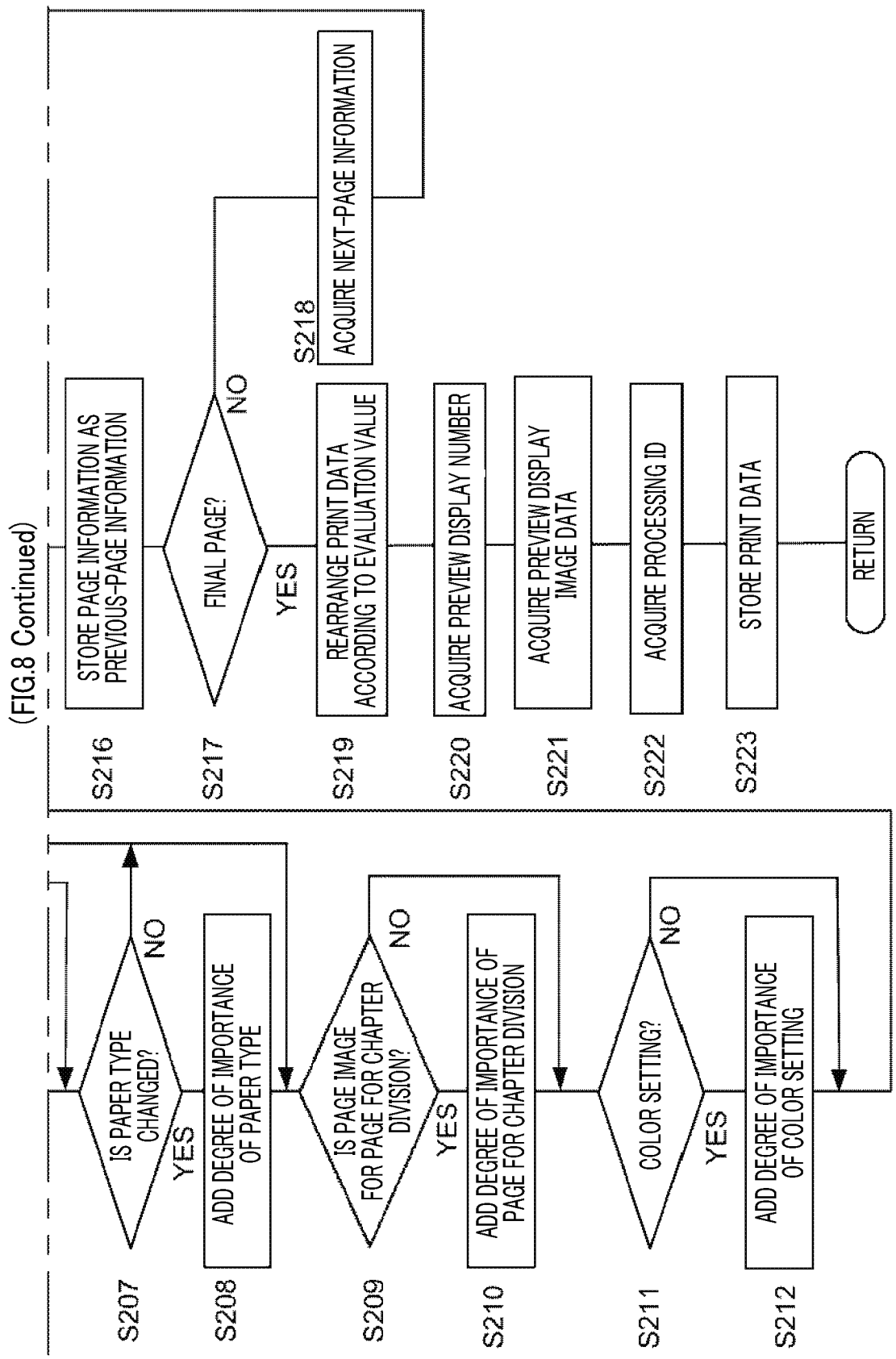

(CONT.)

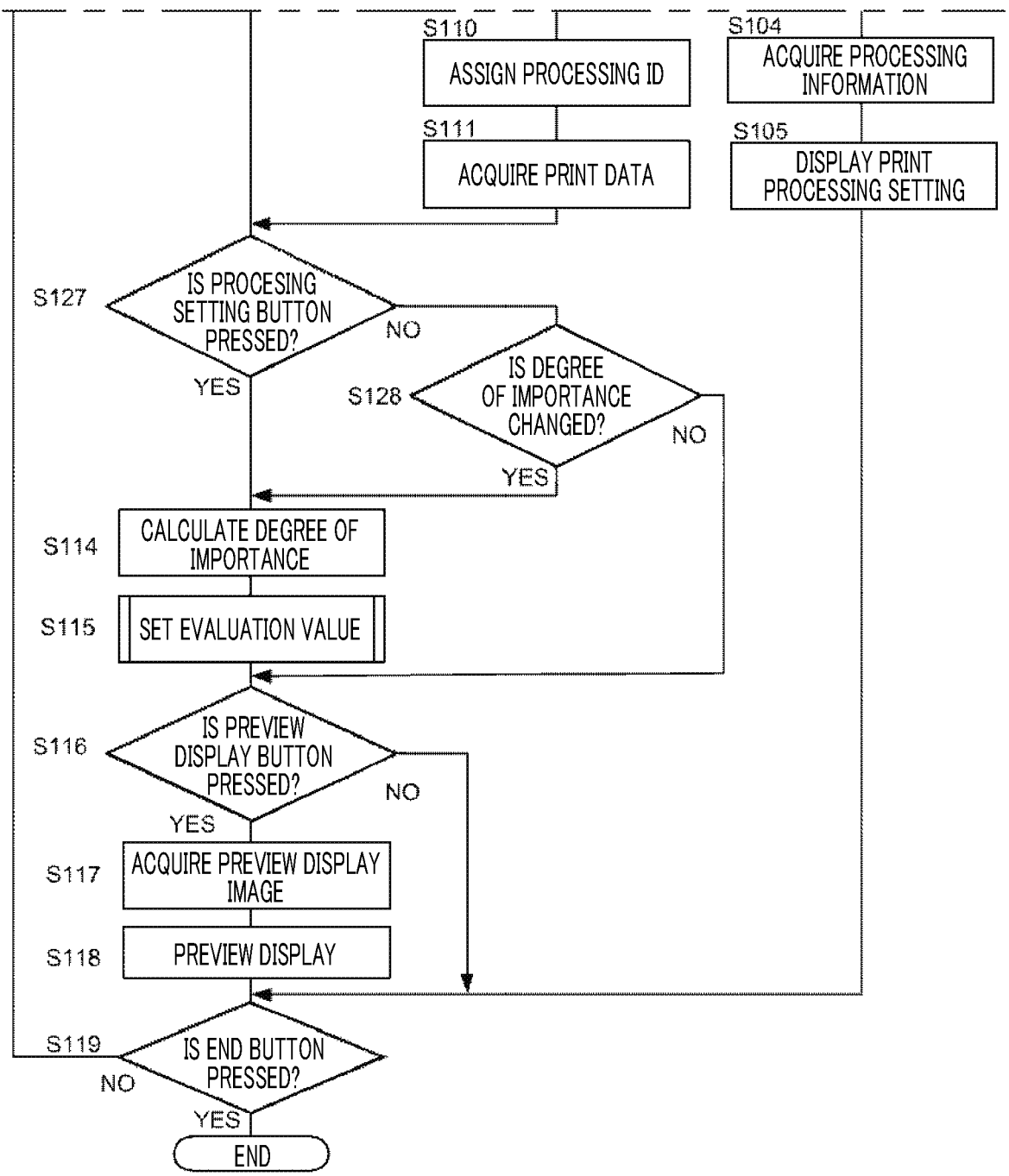

INFORMATION PROCESSING APPARATUS AND NON-TRANSITORY COMPUTER READABLE MEDIUM FOR EVALUATING PAGE IMAGES USING ATTRIBUTE INFORMATION

CROSS-REFERENCE TO RELATED APPLICATIONS

This application is based on and claims priority under 35 USC 119 from Japanese Patent Application No. 2019-126033 filed Jul. 5, 2019.

BACKGROUND

(i) Technical Field

The present disclosure relates to an information processing apparatus and a non-transitory computer readable medium.

(ii) Related Art

JP-A-2009-301307 discloses a representative image extraction method including a first step of designating a job, a second step of reading a job after rasterization corresponding to the designated job from a storage section, a third step of acquiring information indicating attributes of each page included in the read job and/or a change in the attributes, a fourth step of calculating an evaluation value for each page on the basis of the information indicating the attributes and/or the change in the attributes, a fifth step of extracting at least one page having a large evaluation value and specifying an image of the at least one page as a representative image of the job, and a sixth step of causing a display section to display the representative image.

In some cases, an evaluation value of each of page images included in print data may be set using attribute information in which a degree of importance is set for each attribute representing a feature of the print data, and previews of the page images in a descending order of the evaluation values may be displayed. Here, when the evaluation value of the page image is set using the attribute information which is set in advance regardless of the type of the print data, depending on the type of the print data, previews of the page images required for grasping the whole image of the print data may not always be displayed.

SUMMARY

Aspects of non-limiting embodiments of the present disclosure relate to providing an information processing apparatus and a non-transitory computer readable medium, which enable display of previews of page images necessary for understanding the whole image of print data, which correspond to the type of the print data, in contrast to a case where attribute information set in advance is used to set an evaluation value for a page image regardless of the type of the print data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a reception section that receives print data including plural page images and receives data on what type the print data is for selecting attribute information with a degree of importance set for each attribute indicating a feature of the page image; an acquisition section that acquires the attribute information according to the type of the print data; a setting section that sets an evaluation value for each of the page images included in the print data by using the acquired attribute information; and a control section that performs a control to display previews of the page images according to the evaluation values.

BRIEF DESCRIPTION OF THE DRAWINGS

Exemplary embodiments of the present invention will be described in detail based on the following figures, wherein:

FIG. 3 is a schematic diagram illustrating an example of an attribute information database according to each exemplary embodiment;

FIG. 4 is a schematic diagram illustrating an example of a processing information database according to each exemplary embodiment;

DETAILED DESCRIPTION

Hereinafter, exemplary embodiments for carrying out the techniques of the present disclosure will be described in detail with reference to the drawings. An aspect in which an information processing apparatus 1 according to the exemplary embodiment is a server managing print data or the like will be described. However, the disclosure is not limited thereto. The information processing apparatus 1 may be mounted on a multifunction machine having functions such as a print function, a copy function, a scan function, and a facsimile function, or may be a terminal such as a personal computer. An aspect in which the print data is in a raster format representing an image as a series of dots will be described. However, the disclosure is not limited thereto. The print data may be in a vector format represented as a set of draw commands.

Figure 1:
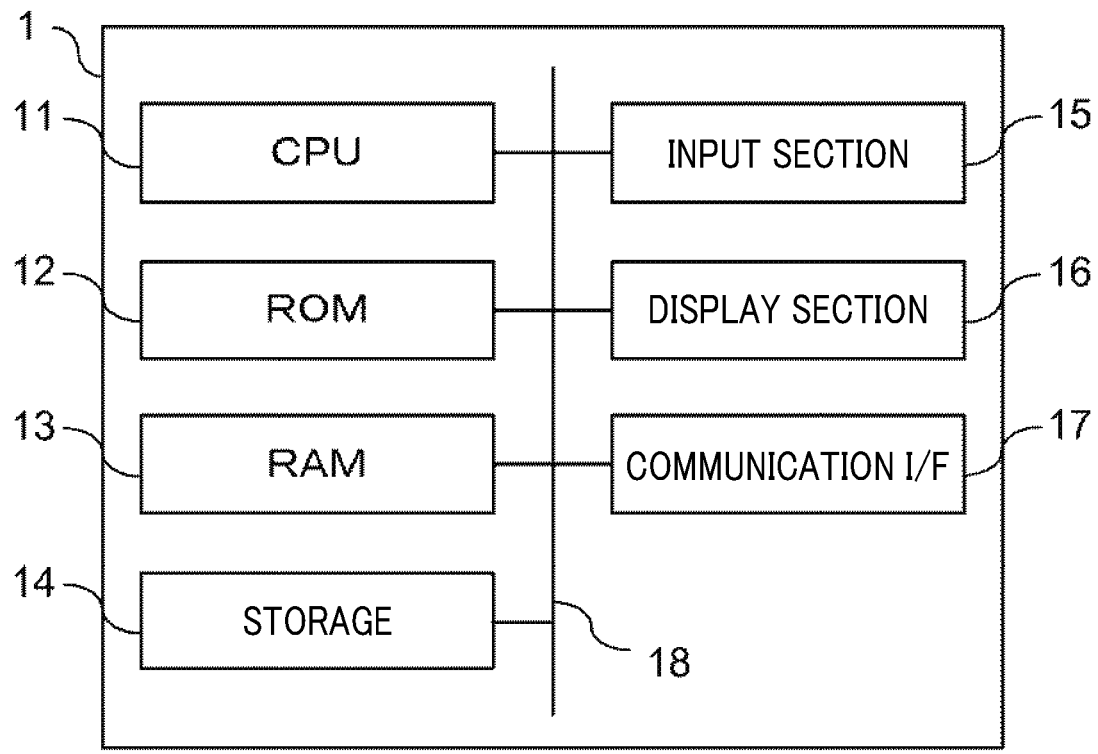
FIG. 1 is a block diagram illustrating an example of a hardware configuration of an information processing apparatus according to each exemplary embodiment.

FIG. 1 is a block diagram illustrating an example of a hardware configuration of the information processing apparatus 1 according to the exemplary embodiment. As illustrated in FIG. 1, the information processing apparatus 1 according to the exemplary embodiment is configured to include a central processing unit (CPU) 11, read only memory (ROM) 12, random access memory (RAM) 13, a storage 14, an input section 15, a display section 16, and a communication interface (communication I/F) 17. The CPU 11, the ROM 12, the RAM 13, the storage 14, the input section 15, the display section 16, and the communication I/F 17 are connected to each other via a bus 18.

The CPU 11 collectively controls the entire information processing apparatus 1. The ROM 12 stores various programs including the information processing program used in the exemplary embodiment, data, and the like. The RAM 13 is a memory used as a work area when executing various programs. The CPU 11 develops a program stored in the ROM 12 in the RAM 13 and executes the program to perform a preview display by rearranging the print data. The storage 14 is, for example, a hard disk drive (HDD), a solid state drive (SSD), or flash memory. The storage 14 may store the information processing program or the like. The input section 15 is a keyboard, a mouse, or the like which receives an input of the print data which is to be displayed as a preview, the display number for a preview display, and the like. The display section 16 is a monitor or the like which displays a preview of the rearranged print data. The communication I/F 17 performs transmission and reception of data.

Figure 2:
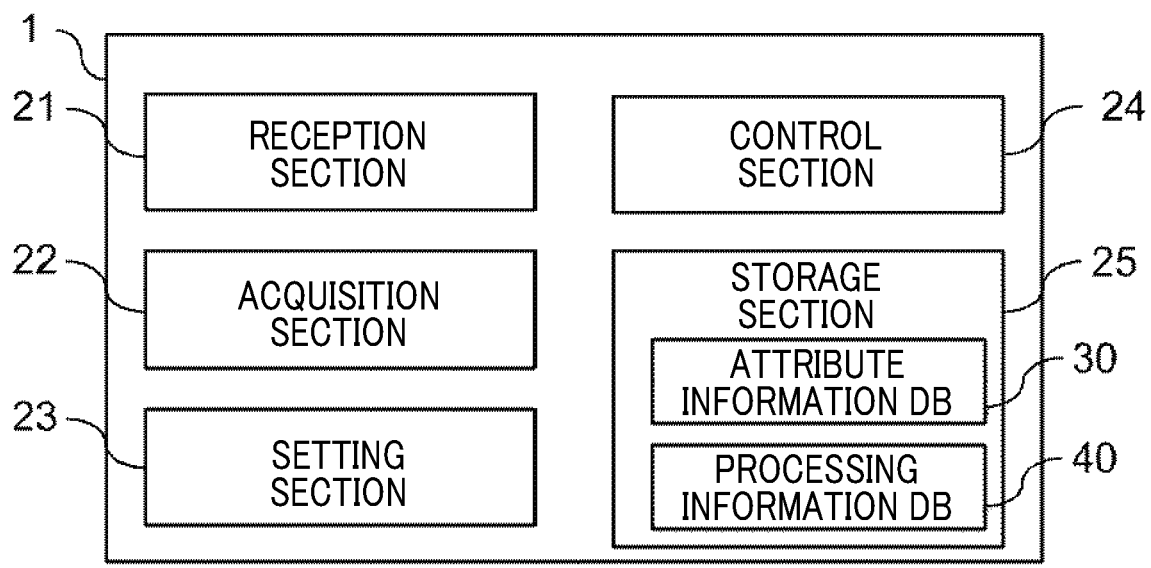
FIG. 2 is a block diagram illustrating an example of a functional configuration of the information processing apparatus according to each exemplary embodiment.

Next, the functional configuration of the information processing apparatus 1 will be described. FIG. 2 is a block diagram illustrating an example of the functional configuration of the information processing apparatus 1 according to the exemplary embodiment.

As illustrated in FIG. 2, the information processing apparatus 1 includes a reception section 21, an acquisition section 22, a setting section 23, a control section 24, a storage section 25. The CPU 11 executes the information processing program to function as the reception section 21, the acquisition section 22, the setting section 23, the control section 24, and the storage section 25.

The reception section 21 receives data including plural page images (hereinafter, referred to as "print data"), and the type of print data for selecting information in which a degree of importance is set for each attribute representing a feature of the page image (hereinafter, referred to as "attribute information"). The reception section 21 receives the number of page images to be displayed as a preview, and a change in the degree of importance of the attribute information displayed on the display section 16.

The acquisition section 22 acquires the attribute information according to the type of the print data, and the changed attribute information. The setting section 23 sets an evaluation value of each page image included in the print data, using the acquired attribute information. The setting section 23 sets again the evaluation value using the changed attribute information.

The control section 24 performs a control to display previews of the page images according to the evaluation values, and when previews of the page images are displayed, the control section 24 performs a control to display previews of the page image together with the selected type of print data, and displaying previews of the received number of page images. The control section 24 performs a control to display the attribute information when the reception section 21 receives the change in the attribute information, and notifies that the attribute information is changed when the reception section 21 has received the change in the attribute information. The control section 24 performs a control to display previews of the page images according to the evaluation values that are set again, and performs a control to display the page images of the print data stored in the storage section 25. The control section 24 performs a control to display the type of print data when the reception section 21 receives the type of print data, and performs a control to display the attribute information according to the received type of print data when the reception section 21 has received the type of print data. The control section 24 performs control of notifying that the attribute information according to the received type of print data is set when the reception section 21 has received the type of print data.

The storage section 25 stores the attribute information in advance, and stores the page image of the print data and the type of print data that the reception section 21 has received. The storage section 25 stores an attribute information database (hereinafter, referred to as "attribute information DB") 30 in which the type and the degree of importance are associated with each other, and a processing information database (hereinafter, referred to as "processing information DB") 40 in which the print data and the changed degree of importance are associated with each other.

Next, before the operation of the information processing apparatus 1 is described, a method of displaying a preview of the print data by changing the degree of importance of the attribute information which is performed by the information processing apparatus 1 will be described with reference to FIGS. 3 to 6.

Referring to FIG. 3, the attribute information DB 30 will be described. FIG. 3 is a schematic diagram illustrating an example of the attribute information DB 30 according to the exemplary embodiment.

For example, as illustrated in FIG. 3, the attribute information DB 30 includes a type number, a type, an initial key attribute, and an initial degree of importance, as the attribute information. The type number is a number that is set for associating a type that the reception section 21 has received, with a degree of importance included in the attribute information. The type is the name of the type that each type number indicates. The key attribute is a particularly important attribute when the evaluation value of the page image is set, and the initial key attribute is the name of the key attribute set in advance. The degree of importance is a value for each attribute for setting an evaluation value of the page image included in the print data, and the initial degree of importance is an initial value of the degree of importance. The attribute information includes, as the attribute, a page for chapter division, a paper size, a paper type, color setting, and an image ratio, and the degree of importance is set for each type and attribute.

Next, referring to FIG. 4, the processing information DB 40 will be described. FIG. 4 is a schematic diagram illustrating an example of the processing information DB 40 according to the exemplary embodiment.

For example, as illustrated in FIG. 4, the processing information DB 40 includes, as the processing information, a processing identification (ID), a print data file name, a type number, a changed key attribute, a changed degree of importance, a preview display number. The processing ID is a uniquely set number for associating the print data that the reception section 21 has received, with the attribute information. The print data file name is a file name set as the print data. The changed key attribute is a key attribute that the reception section 21 has received. The changed degree of importance is a calculated degree of importance according to the key attribute that the reception section 21 has received.

The preview display number is the display number of page images of the print data to be displayed on the preview screen.

As described above, the key attribute can be changed, and by selecting a key attribute among the attributes, the degree of importance of the selected attribute can be changed. For example, when "4: advertising flyer" is selected as the type, the "image ratio" is set as the initial setting of the key attribute and is displayed on the display section 16. When the displayed key attribute is changed from the "image ratio" to the "color setting", the initial degree of importance "30" where the type is "advertising flyer" and the attribute is the "color setting" is acquired from the attribute information DB 30 (refer to FIG. 3). Using the acquired degree of importance "30", a new degree of importance is calculated (for example, "30" is multiplied by 2 to be "60"), and is set as the degree of importance of "color setting" to be stored in the processing information DB 40 (refer to FIG. 4). The exemplary embodiment shows an aspect of multiplying the degree of importance when the key attribute is changed. However, the disclosure is not limited thereto. Any value may be added to the acquired degree of importance. In the exemplary embodiment, an aspect of calculating a new degree of importance of the attribute using the degree of importance of the attribute acquired from the attribute information DB 30 is described. However, the disclosure is not limited thereto. When the changed degree of importance of the attribute is further changed, a new degree of importance of the attribute may be calculated using the degree of importance of the attribute acquired from the processing information DB 40.

In short, the degree of importance of the attribute is changed by changing the key attribute to change the degree of importance of the attribute acquired from the attribute information DB 30 or the processing information DB 40, and the changed degree of importance of the attribute is stored in the processing information DB 40 as the changed degree of importance.

The evaluation value of the page image of the print data that the reception section 21 has received is set using the changed degree of importance stored in the processing information DB 40. The print data is rearranged in a descending order of set evaluation values, the page images for a preview display number (hereinafter, referred to as "preview display image data") that the reception section 21 has received, from the image having the highest evaluation value and the processing ID are associated with each other and stored in the storage section 25.

Figure 5:
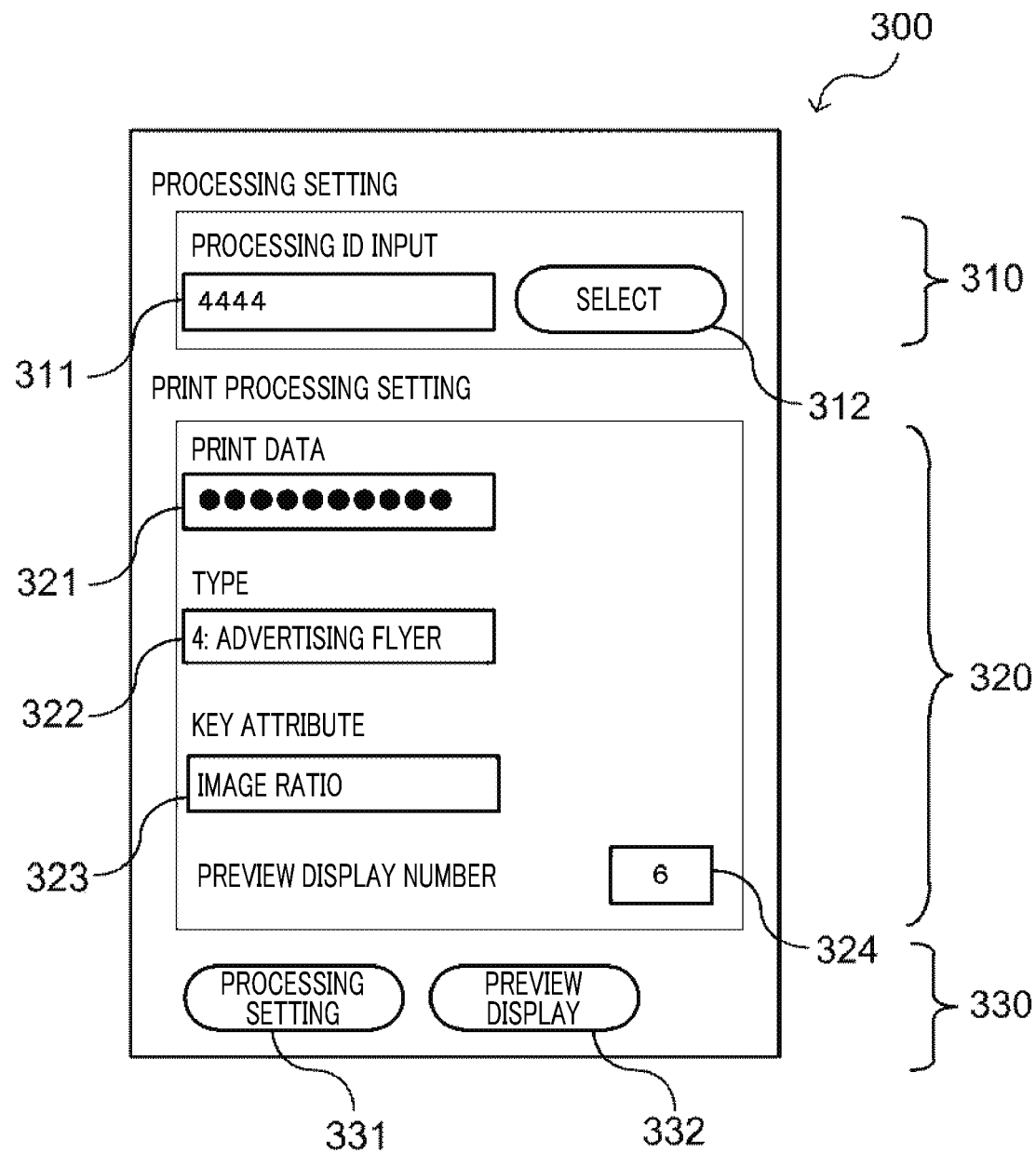
FIG. 5 is a diagram illustrating an example of a processing setting screen according to a first exemplary embodiment.

Next, referring to FIG. 5, the processing setting screen will be described. FIG. 5 is a diagram illustrating an example of the processing setting screen according to the exemplary embodiment.

For example, as illustrated in FIG. 5, the processing setting screen 300 includes a processing setting region 310, a print processing setting region 320, and an execution instruction region 330. The processing setting region 310 includes a processing ID input region 311, and a selection button 312. The print processing setting region 320 includes a print data input region 321, a type selection region 322, a key attribute selection region 323, and a preview display number input region 324. The execution instruction region 330 includes a processing setting button 331, and a preview display button 332.

For example, in a case of performing initial setting of print processing, a storage location of the print data is input to the print data input region 321 and the print data is selected. The type is selected in the type selection region 322, the key attribute is selected in the key attribute selection region 323, the display number is input to the preview display number input region 324, and then the processing setting button 331 is pressed to set the print processing in the information processing apparatus 1. When the type is selected in the type selection region 322, selectable types are displayed in the type selection region 322, and when the key attribute is selected in the key attribute selection region 323, selectable key attributes are displayed in the key attribute selection region 323. For the type and key attribute to be displayed, a control to display or not to display may be performed for each user, and a control to display selectable key attributes according to the selected type may be performed. The setting of the print processing is processing of storing processing information, print data, rearranged print data, and preview display image data in the storage section 25 in association with the processing ID.

Further, when the set print processing is displayed as a preview or the set processing is changed, the processing ID is input to the processing ID input region 311. When the selection button 312 is pressed after the processing ID is input, the print data, the type, the key attribute, and the preview display number associated with the processing ID are displayed in the print processing setting region. When the preview display button 332 is pressed, the preview of the selected print data is displayed. When the key attribute has been changed, when the processing setting button 331 or the preview display button 332 is pressed, according to the changed key attribute, the degree of importance is calculated, the page image of the print data is evaluated, and the page image of the print data rearranged in a descending order of the evaluation values is stored.

Figure 6:
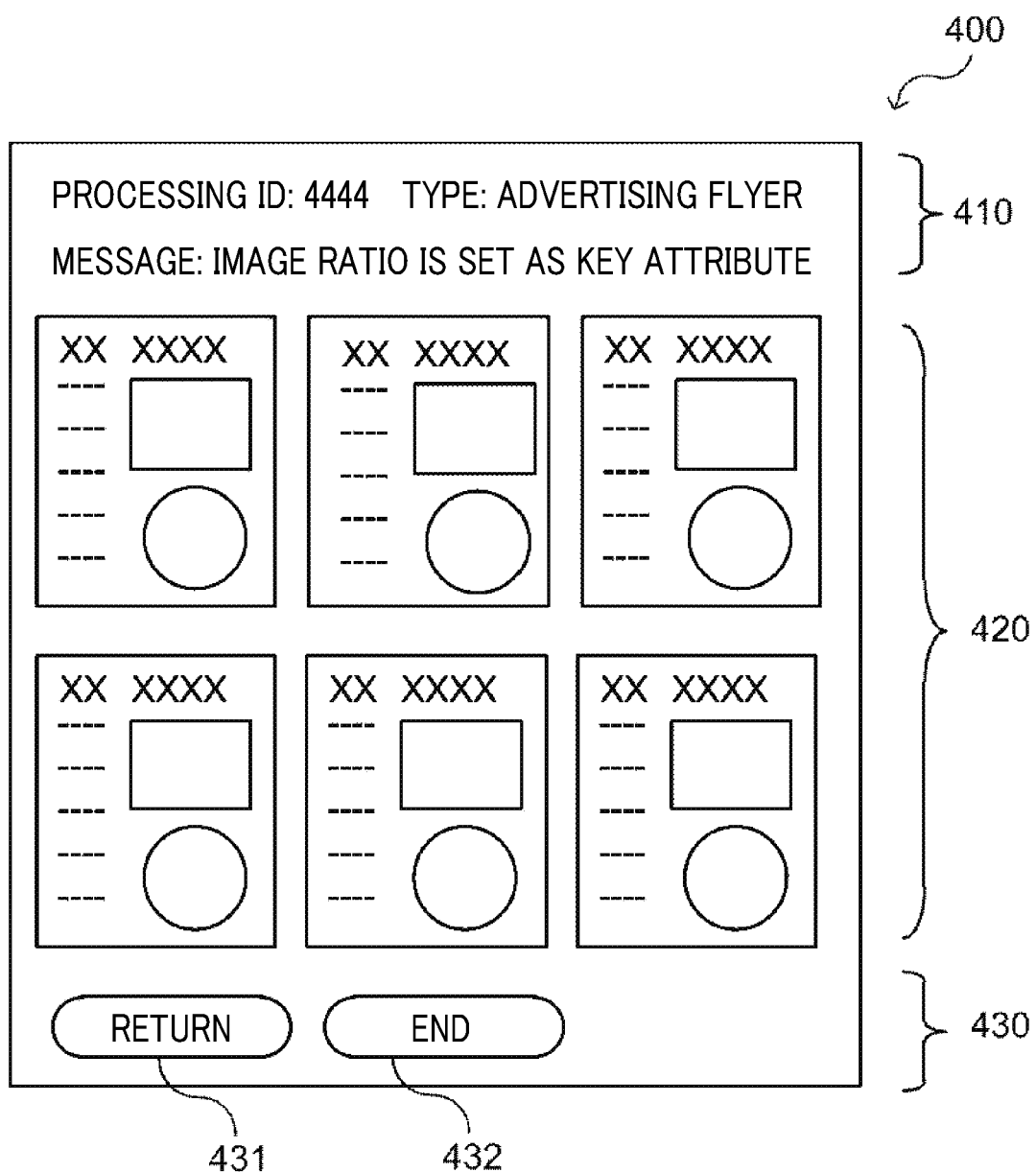
FIG. 6 is a diagram illustrating an example of a preview screen according to each exemplary embodiment.

Next, referring to FIG. 6, the preview screen will be described. FIG. 6 is a diagram illustrating an example of the preview screen according to the exemplary embodiment.

For example, as illustrated in FIG. 6, the preview screen 400 includes a message display region 410, a preview image display region 420, and an end instruction region 430.

For example, the processing ID, the type set in the processing setting screen 300, and the message are displayed in the message display region 410. The message displays contents according to the setting and the change, such as the selected type being set, the key attribute according to the selected type being set, and the key attribute being changed. When preview images are displayed, the preview image display region 420 displays page images of the print data, which correspond to the preview display number input on the processing setting screen 300, in a descending order of the evaluation values calculated using the degree of importance of the attribute information. The end instruction region 430 includes a return button 431 and an end button 432. When the return button 431 is pressed, the processing setting screen 300 is displayed, and when the end button 432 is pressed, the preview display is ended. In the exemplary embodiment, an aspect of displaying the set type, the attribute information, and the message when the previews of the page images are displayed is described. However, the disclosure is not limited thereto. The degree of importance of each attribute included in the attribute information may be displayed, or the evaluation value of the page image may be displayed.

Figure 7:
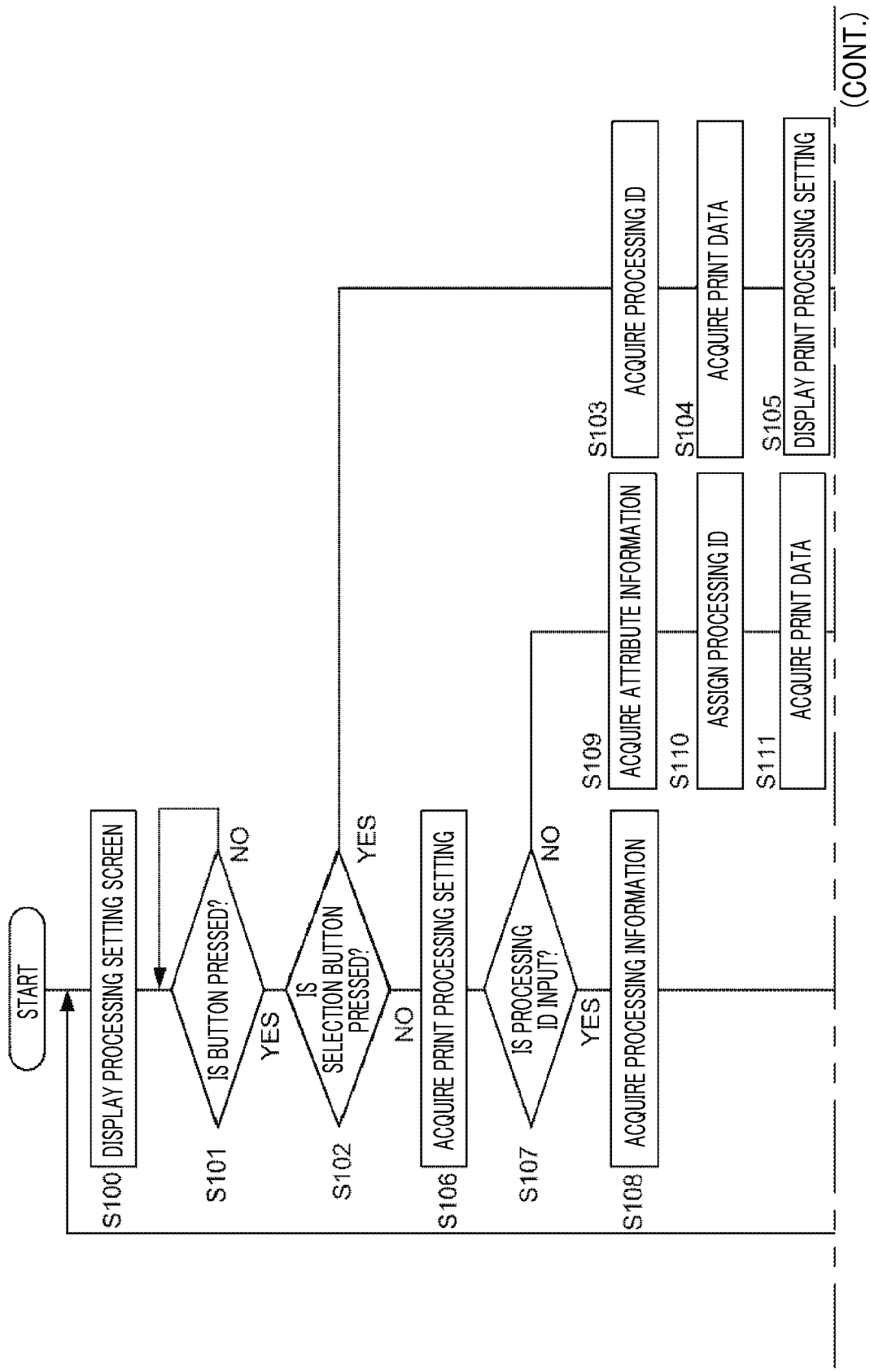
FIG. 7 is a flowchart illustrating an example of information processing according to the first exemplary embodiment.
Figure 8:
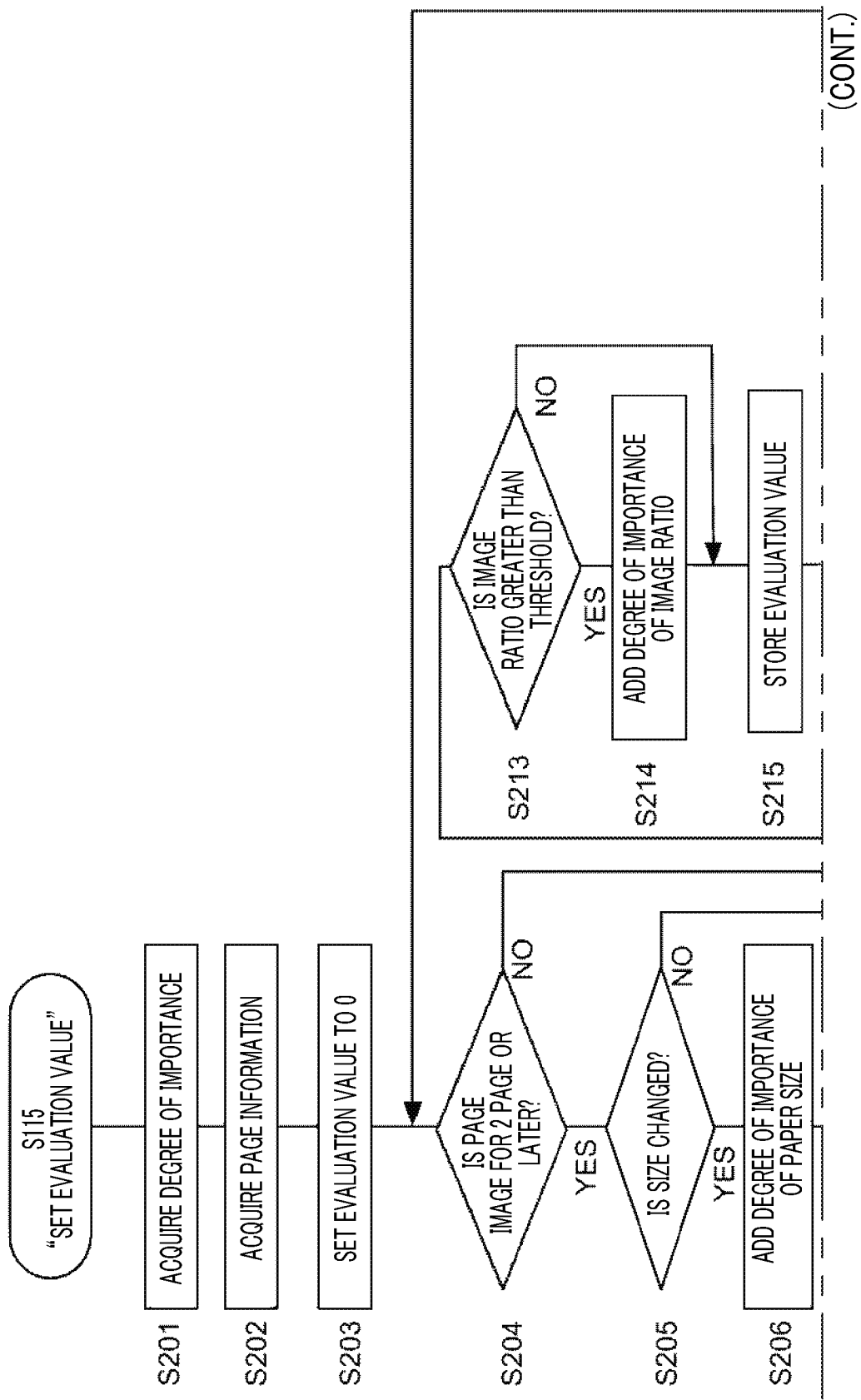
FIG. 8 is a flowchart illustrating an example of evaluation value setting processing according to each exemplary embodiment.

Next, an operation of the information processing program according to the exemplary embodiment will be described with reference to FIGS. 7 and 8. FIG. 7 is a flowchart illustrating an example of information processing according to the exemplary embodiment. The CPU 11 reads the information processing program from the ROM 12 or the storage 14, and executes the information processing program so that the information processing illustrated in FIG. 7 is executed. For example, when the information processing apparatus 1 is activated, an instruction of executing the information processing program is input, and the information processing illustrated in FIG. 7 is executed.

In step S100, the CPU 11 displays the processing setting screen 300.

In step S101, the CPU 11 determines whether any button is pressed on the processing setting screen 300. When a button is pressed (step S101: YES), the CPU 11 proceeds to step S102. On the other hand, when a button is not pressed (step S101: NO), the CPU 11 stands by until a button is pressed.

In step S102, the CPU 11 determines whether the selection button 312 is pressed. When the selection button 312 is pressed (step S102: YES), the CPU 11 proceeds to step S103. On the other hand, when the selection button 312 is not pressed (step S102: NO), the CPU 11 proceeds to step S106.

In step S103, the CPU 11 acquires the processing ID input on the processing setting screen 300.

In step S104, the CPU 11 acquires the processing information including the print data file name, the type number, the changed key attribute, the changed degree of importance, the preview display number suitable for the processing ID input on the processing setting screen 300, from the processing information DB 40. The CPU 11 acquires the type suitable for the type number acquired from the processing information DB 40, from the attribute information DB 30.

In step S105, the CPU 11 displays the print processing setting including the print data file name, the type, the key attribute, the preview display number, which are acquired, on the print processing setting region 320 of the processing setting screen 300.

In step S106, the CPU 11 acquires the print processing setting including the print data, the type, the key attribute, the preview display number which are input on the print processing setting region 320 of the processing setting screen 300.

In step S107, the CPU 11 determines whether the processing ID is input on the processing setting screen 300. When the processing ID is input (step S107: YES), the CPU 11 proceeds to step S108. On the other hand, when the processing ID is not input (step S107: NO), the CPU 11 proceeds to step S109.

In step S108, the CPU 11 acquires the processing information including the print data file name, the type number, the changed key attribute, the changed degree of importance, the preview display number suitable for the processing ID input on the processing setting screen 300, from the processing information DB 40. The CPU 11 acquires the type suitable for the type number acquired from the processing information DB 40, from the attribute information DB 30. The print data suitable for the processing ID is acquired from the storage section 25.

In step S109, the CPU 11 acquires the attribute information including the type, the initial key attribute, and the initial degree of importance suitable for the type selected in the type selection region 322, from the attribute information DB 30.

In step S110, the CPU 11 assigns a unique processing ID.

In step S111, the CPU 11 acquires the print data from the storage location of the print data input on the processing setting screen 300.

In step S112, the CPU 11 determines whether the processing setting button 331 is pressed. When the processing setting button 331 is pressed (step S112: YES), the CPU 11 proceeds to step S114. On the other hand, when the processing setting button 331 is not pressed (step S112: NO), the CPU 11 proceeds to step S113.

In step S113, the CPU 11 determines whether the key attribute is changed by comparing the key attribute acquired from the attribute information DB 30 or the processing information DB 40 with the key attribute input on the processing setting screen 300. When the key attribute is changed (step S113: YES), the CPU 11 proceeds to step S114. On the other hand, when the key attribute is not changed (step S113: NO), the CPU 11 proceeds to step S116.

In step S114, the CPU 11 calculates a new degree of importance using the degree of importance acquired from the attribute information DB 30 or the processing information DB 40, according to the key attribute input on the processing setting screen 300.

In step S115, the CPU 11 sets an evaluation value of the page image of the print data using the calculated degree of importance, and stores the preview display image data according to the set evaluation value and the preview display number in the storage section 25. When the key attribute of the processing information which is set once is changed (change in the degree of importance of the attribute of the processing information) and is set again or displayed as a preview, a new degree of importance is calculated from the degree of importance of the attribute acquired from the processing information DB 40, and the evaluation value is set again. The preview display image data is acquired using the evaluation value that is set again, and is stored in the storage section 25. The evaluation value setting processing in step S115 will be described in detail with reference to FIG. 8.

In step S116, the CPU 11 determines whether the preview display button 332 is pressed. When the preview display button 332 is pressed (step S116: YES), the CPU 11 proceeds to step S117. On the other hand, when the preview display button 332 is not pressed (step S116: NO), the CPU 11 proceeds to step S119.

In step S117, the CPU 11 acquires the preview display image data suitable for the processing ID from the storage section 25.

In step S118, the CPU 11 displays the acquired preview display image data, the type, and the message on the preview screen 400.

In step S119, the CPU 11 determines whether the end button 432 is pressed. When the end button 432 is pressed (step S119: YES), the CPU 11 ends the preview display processing. On the other hand, when the end button 432 is not pressed (step S119: NO), the CPU 11 proceeds to step S100. For example, when the selection button 312, the processing setting button 331, and the return button 431 are pressed, the processing setting screen 300 is displayed.

Next, referring to FIG. 8, the evaluation value setting processing will be described. FIG. 8 is a flowchart illustrating an example of the evaluation value setting processing according to the exemplary embodiment. When the processing setting button 331 or the preview display button 332 of the processing setting screen 300 is pressed and thus an execution instruction is input, the evaluation value setting processing illustrated in FIG. 8 is executed.

In step S201, the CPU 11 acquires the calculated degree of importance.

In step S202, the CPU 11 acquires page information of the first page image from the print data. The page information is information on whether the page image is for a page for chapter division, the paper size of the page image, the paper type of the page image, color setting of the page image, and the ratio of the image in the page image.

In step S203, the CPU 11 sets the evaluation value to 0.

In step S204, the CPU 11 determines whether the acquired page image is for 2 page or later. When the acquired page image is for 2 page or later (step S204: YES), the CPU 11 proceeds to step S205. On the other hand, when the acquired page image is not for 2 page or later (step S204: NO), the CPU 11 proceeds to step S209.

In step S205, the CPU 11 determines whether the paper size is different by comparing previous-page information with the page information. When the paper size is different (step S205: YES), the CPU 11 proceeds to step S206. On the other hand, when the paper size is not different (step S205: NO), the CPU 11 proceeds to step S207. The previous-page information is page information of the page image for the page one before the page information of the page image at the current time.

In step S206, the CPU 11 adds the degree of importance of the paper size to the evaluation value.

In step S207, the CPU 11 determines whether the paper type is different by comparing the previous-page information with the page information. When the paper type is different (step S207: YES), the CPU 11 proceeds to step S208. On the other hand, when the paper type is not different (step S207: NO), the CPU 11 proceeds to step S209.

In step S208, the CPU 11 adds the degree of importance of the paper type to the evaluation value.

In step S209, the CPU 11 determines whether the page image is for a page for chapter division. When the page image is for a page for chapter division (step S209: YES), the CPU 11 proceeds to step S210. On the other hand, when the page image is not for a page for chapter division (step S209: NO), the CPU 11 proceeds to step S211.

In step S210, the CPU 11 adds the degree of importance of the page for chapter division to the evaluation value.

In step S211, the CPU 11 determines whether color setting is set in the page information. When the color setting is set in the page information (step S211: YES), the CPU 11 proceeds to step S212. On the other hand, when the color setting is not set in the page information (step S211: NO), the CPU 11 proceeds to step S213.

In step S212, the CPU 11 adds the degree of importance of the color setting to the evaluation value.

In step S213, the CPU 11 determines whether the ratio of the image included in the page image is greater than a threshold. When the ratio of the image included in the page image is greater than the threshold (step S213: YES), the CPU 11 proceeds to step S214. On the other hand, when the ratio of the image included in the page image is not greater than the threshold (step S213: NO), the CPU 11 proceeds to step S215.

In step S214, the CPU 11 adds the degree of importance of the image ratio to the evaluation value.

In step S215, the CPU 11 stores the evaluation value calculated for the page image.

In step S216, the CPU 11 stores the page information as the previous-page information.

In step S217, the CPU 11 determines whether the page information is page information for the final page in the print data. When the page information is page information for the final page in the print data (step S217: YES), the CPU 11 proceeds to step S219. On the other hand, when the page information is not page information for the final page in the print data (step S217: NO), the CPU 11 proceeds to step S218.

In step S218, the CPU 11 acquires next-page information and sets the next-page information as the page information. The next-page information is page information of the page image for the page one after the page information of the page image at the current time.

In step S219, the CPU 11 rearranges the page images included in the print data in a descending order of the set evaluation values of the page images.

In step S220, the CPU 11 acquires the preview display number.

In step S221, the CPU 11 acquires the preview display image data from the rearranged print data.

In step S222, the CPU 11 acquires the processing ID.

In step S223, the CPU 11 stores the print data, the rearranged print data, and the preview display image data in the storage section 25 in association with the processing ID.

As described above, according to the exemplary embodiment, the evaluation value of the page image included in the print data is set using the degree of importance of the attribute corresponding to the type of the print data. By setting the evaluation value of the page image, the page images are rearranged, and the previews of the page images required for grasping the whole image of the print data corresponding to the type of the print data are displayed.

Second Exemplary Embodiment

In the first exemplary embodiment, an aspect in which the degree of importance of the attribute is changed by changing the type is described. In the exemplary embodiment, an aspect in which the degree of importance of the attribute corresponding to the selected type is displayed and the change in the degree of importance is received by inputting the value of the degree of importance is described. Since the block diagram (refer to FIG. 1) illustrating the hardware configuration of the information processing apparatus 1, the block diagram (refer to FIG. 2) illustrating the functional configuration of the information processing apparatus 1, and the schematic diagram (refer to FIG. 3) illustrating the attribute information DB 30 according to the exemplary embodiment are the same as the first exemplary embodiment, the description thereof is omitted. Further, since the schematic diagram (refer to FIG. 4) illustrating the attribute information DB 30, the diagram (refer to FIG. 6) illustrating the preview screen, and the flowchart (refer to FIG. 8) illustrating the evaluation value setting processing are the same as the first exemplary embodiment, the description thereof is omitted.

Figure 9:
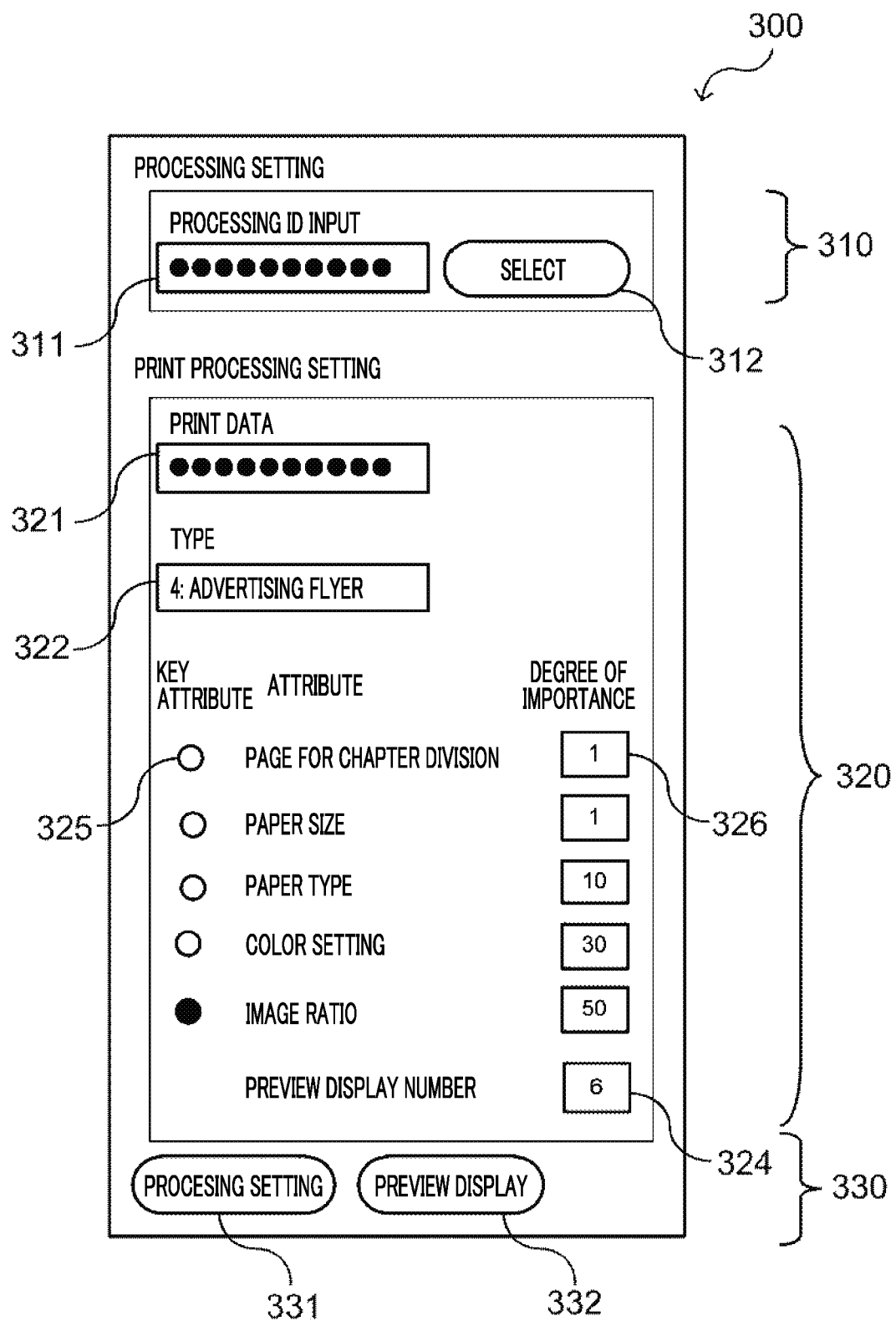
FIG. 9 is a diagram illustrating an example of a processing setting screen according to a second exemplary embodiment.

Next, referring to FIG. 9, the processing setting screen 300 according to the second exemplary embodiment will be described. FIG. 9 is a diagram illustrating an example of the processing setting screen 300 according to the second exemplary embodiment. Instead of the processing setting screen 300 illustrated in FIG. 5, the processing setting screen 300 illustrated in FIG. 9 is displayed by the information processing apparatus 1. Further, in FIG. 9, the same constituent as the function of the processing setting screen 300 illustrated in FIG. 5 is given the same reference numeral as that in FIG. 5, and the description thereof is omitted.

For example, as illustrated in FIG. 9, the processing setting screen 300 includes the processing setting region 310, the print processing setting region 320, and the execution instruction region 330. The processing setting region 310 includes a processing ID input region 311, and a selection button 312. The print processing setting region 320 includes the print data input region 321, the type selection region 322, the preview display number input region 324, a key attribute selection button 325, and a degree-of-importance input region 326. The execution instruction region 330 includes a processing setting button 331, and a preview display button 332.

For example, in a case of performing initial setting of the print processing, when a storage location of the print data is input to the print data input region 321 and the type is selected in the type selection region 322, the key attribute according to the selected type is displayed in the key attribute selection button 325, and the degree of importance is displayed in the degree-of-importance input region 326. When the display number is input in the preview display number input region 324 and the processing setting button 331 is pressed, the print processing is set in the information processing apparatus 1.

Further, when the set print processing is displayed as a preview, when the processing ID is input in the processing ID input region 311 and the selection button 312 is pressed, the processing information associated with the processing ID is displayed in the print processing setting region 320. When the preview display button 332 is pressed, the preview of the selected print data is displayed. When the key attribute is changed before the preview display button 332 is pressed, a degree of importance is calculated according to the degree of importance of the selected key attribute, and the calculated degree of importance is displayed in the degree-of-importance input region 326. The degree of importance can be changed by inputting the degree of importance in the degree-of-importance input region 326. Using the degree of importance calculated by changing the key attribute or the degree of importance obtained by inputting the degree of importance, the page image of the print data is evaluated, and the previews of the page images of the print data are displayed.

Figure 10:
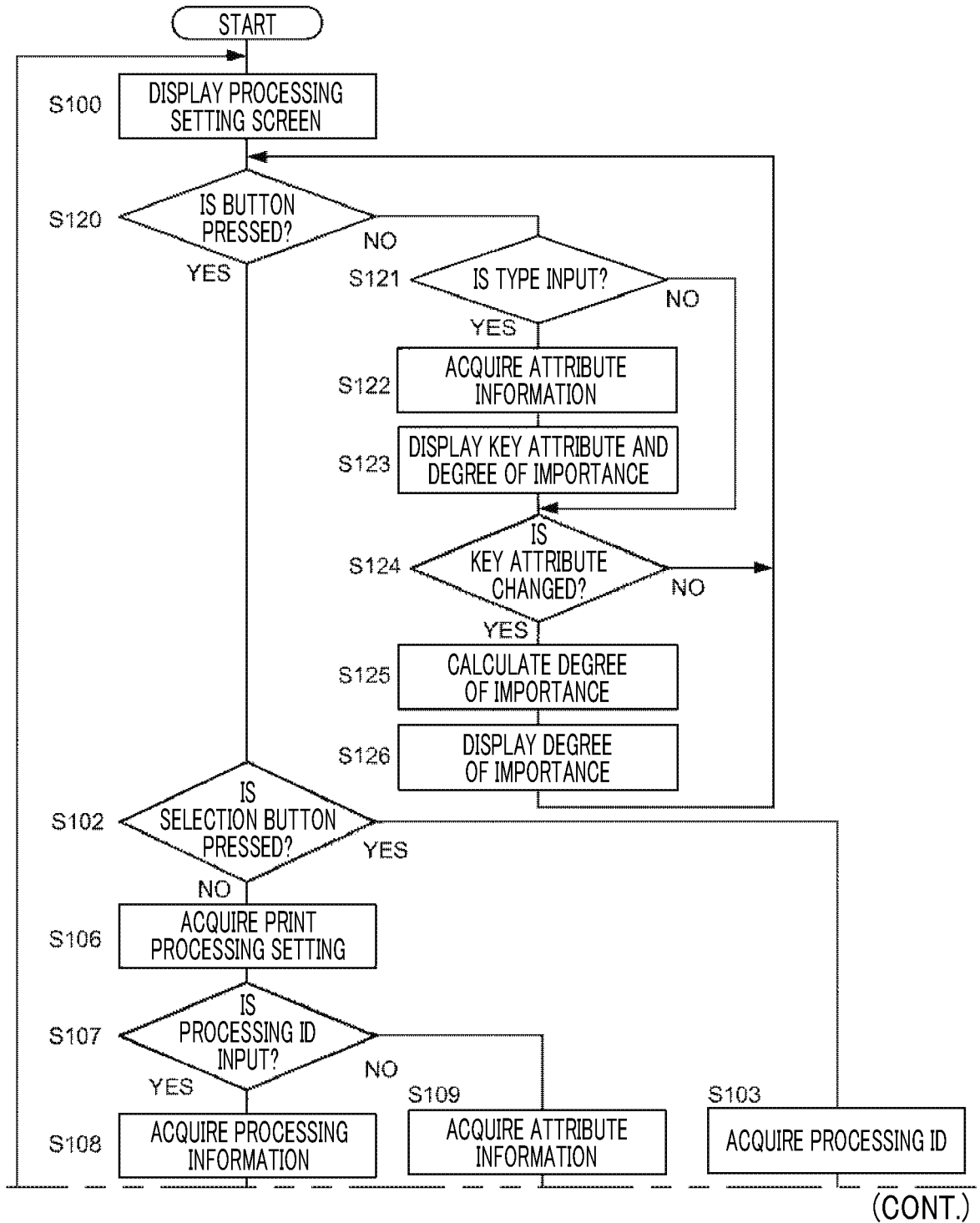
FIG. 10 is a flowchart illustrating an example of information processing according to the second exemplary embodiment.

Next, an operation of the information processing program according to the exemplary embodiment will be described with reference to FIG. 10. FIG. 10 is a flowchart illustrating an example of information processing according to the second exemplary embodiment. The CPU 11 reads the information processing program from the ROM 12 or the storage 14, and executes the information processing program so that the information processing illustrated in FIG. 10 is executed. For example, when the information processing apparatus 1 is activated, an instruction of executing the information processing program is input, and the information processing illustrated in FIG. 10 is executed. In FIG. 10, the same step as the identification processing illustrated in FIG. 7 is given the same reference numeral as that in FIG. 7, and the description thereof is omitted.

In step S120, the CPU 11 determines whether a button is pressed. When a button is pressed (step S120: YES), the CPU 11 proceeds to step S102. On the other hand, when a button is not pressed (step S120: NO), the CPU 11 proceeds to step S121.

In step S121, the CPU 11 determines whether the type is input. When the type is input (step S121: YES), the CPU 11 proceeds to step S122. On the other hand, when the type is not input (step S121: NO), the CPU 11 proceeds to step S124.

In step S122, the CPU 11 acquires the attribute information including the type, the initial key attribute, and the initial degree of importance suitable for the type selected in the type selection region 322, from the attribute information DB 30.

In step S123, the CPU 11 displays the initial key attribute and the initial degree of importance acquired from the attribute information DB 30 on the processing setting screen 300.

In step S124, the CPU 11 determines whether the key attribute is changed. When the key attribute is changed (step S124: YES), the CPU 11 proceeds to step S125. On the other hand, when the key attribute is not changed (step S124: NO), the CPU 11 proceeds to step S120.

In step S125, the CPU 11 calculates a new degree of importance using the degree of importance displayed on the processing setting screen 300, according to the key attribute input on the processing setting screen 300.

In step S126, the CPU 11 displays the calculated degree of importance on the processing setting screen 300.

In step S127, the CPU 11 determines whether the processing setting button 331 is pressed. When the processing setting button 331 is pressed (step S127: YES), the CPU 11 proceeds to step S114. On the other hand, when the processing setting button 331 is not pressed (step S127: NO), the CPU 11 proceeds to step S128.

In step S128, the CPU 11 determines whether the degree of importance is changed by comparing the degree of importance of the attribute acquired from the attribute information DB 30 or the processing information DB 40 with the degree of importance of the attribute input on the processing setting screen 300. When the degree of importance is changed (step S128: YES), the CPU 11 proceeds to step S114. On the other hand, when the degree of importance is not changed (step S128: NO), the CPU 11 proceeds to step S116.

According to the exemplary embodiment, the degree of importance of the attribute corresponding to the selected type is displayed and the degree of importance is changed by inputting the value of the degree of importance.

In the exemplary embodiment, an aspect of displaying the fact that the key attribute is changed on the preview screen 400 when the key attribute is changed is described. However, the disclosure is not limited thereto. A destination such as an email address may be stored in advance, and when a key attribute is changed, the fact that the key attribute is changed may be notified to the destination registered in advance. In the exemplary embodiment, an aspect of notifying that the key attribute is changed on the preview screen 400 when the key attribute is changed is described. However, the disclosure is not limited thereto. When the value of the degree of importance is changed, the fact that the value of the degree of importance is changed may be notified.

Further, in the exemplary embodiment, an aspect of changing the degree of importance of the attribute by receiving the change in the key attribute is described. However, the disclosure is not limited thereto. The degree of importance of the attribute may be changed by receiving the change in the type.

In the processing information DB 40 according to the exemplary embodiment, an aspect in which the degree of importance of the attribute is stored for each processing ID and the degree of importance of the attribute associated with the processing ID is changed when the key attribute is changed is described. However, the disclosure is not limited thereto. An aspect in which a user may be identified, the degree of importance of the attribute may be stored for each user and each type, and when the key attribute is changed, the degree of importance of the attribute according to the type associated with the user is changed may be adopted.

In the exemplary embodiment, an aspect in which the print data is rearranged in a descending order of the evaluation value, the preview display image data is acquired from the rearranged print data, and the rearranged print data and the preview display image data are stored is described. However, the disclosure is not limited thereto. An aspect in which an evaluation order in a descending order of the evaluation value is set to each page image of the print data and the page images up to the evaluation order equal to the preview display number is acquired and displayed may be adopted.

In addition, the configuration of the information processing apparatus 1 described in the exemplary embodiment is an example, and may be changed according to a situation within a range not departing from the gist.

The flow of the processing of the program described in the exemplary embodiment is also an example, and in a range not departing from the gist, unnecessary steps may be deleted, a new step may be added, or the processing order may be changed.

In the exemplary embodiment, the information processing executed by the CPU reading software (program) may be executed by various processors other than the CPU. The various processors in this case include a programmable logic device (PLD) of which the circuit configuration can be changed after manufacture, such as a field programmable gate array (FPGA), and a dedicated electrical circuitry, which is a processor having a circuit configuration designed exclusively to execute a specific process, such as an application specific integrated circuit (ASIC). Further, the information processing may be executed by one of the various processors, or executed by the combination of the same or different kinds of two or more processors (for example, combination of plural FPGAs, combination of the CPU and the FPGA, or the like). Furthermore, the hardware structures of the various processors are more specifically electrical circuitry where circuit elements, such as semiconductor elements, are combined.

In the above-described embodiments, an aspect in which the program of the information processing is stored in advance (installed) in the storage 14 is described, but the disclosure is not limited thereto. The program may be provided by being recorded in a recording medium such as a compact disc read only memory (CD-ROM), a digital versatile disc read only memory (DVD-ROM), and Universal Serial Bus (USB). Further, the program may be downloaded from external devices via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to
        receive print data including a plurality of page images;
        receive data indicating a type of the print data for selecting attribute information, the attribute information including a degree of importance set for each attribute indicating a feature of the page image;
        acquire the attribute information according to the type of the print data;
        set an evaluation value for each of the page images included in the print data by using the acquired attribute information; and
        control display previews of the page images according to evaluation values, wherein
    the evaluation values are based on the degree of importance, and
    the degree of importance is changeable by changing the attribute information.

2. The information processing apparatus according to claim 1, wherein
    the processor is configured to control display of the previews of the page images and to control display the selected type of the print data when the previews of the page images are displayed.

3. The information processing apparatus according to claim 2, wherein
    the processor is configured to receive a change in the attribute information according to the displayed type of the print data.

4. The information processing apparatus according to claim 3, wherein
    the processor is configured to control display of the attribute information when the processor receives the change in the attribute information.

5. The information processing apparatus according to claim 4, wherein
    the processor is configured to receive a change in the degree of importance according to the displayed attribute information.

6. The information processing apparatus according to claim 3, wherein
    the processor is configured to notify that the attribute information is changed when the processor has received the change in the attribute information.

7. The information processing apparatus according to claim 3, wherein
    the processor is configured to acquire the changed attribute information,
    the processor is configured to set the evaluation value again by using the changed attribute information, and
    the processor is configured to control display of the previews of the page images according to the evaluation values that are set again.

8. The information processing apparatus according to claim 1, further comprising a memory that stores the page images of the print data, wherein
    the processor is configured to control display of the page images of the print data stored in the memory.

9. The information processing apparatus according to claim 8, wherein
    the memory stores the attribute information in advance.

10. The information processing apparatus according to claim 8, wherein
    the memory stores the type of the print data that the processor has received.

11. The information processing apparatus according to claim 1, wherein
    the processor is configured to control display of the type of the print data when the processor receives the type of the print data.

12. The information processing apparatus according to claim 1, wherein the processor is configured to control display of the attribute information according to the received type of the print data when the processor has received the type of the print data.

13. The information processing apparatus according to claim 1, wherein
the processor is configured to notify that the attribute information according to the received type of the print data is set when the processor has received the type of the print data.

14. The information processing apparatus according to claim 1, wherein
the processor is configured to receive the number of the page images to be displayed as previews, and
the processor is configured to control display of previews of the page images corresponding to the received number.

15. The information processing apparatus according to claim 1, wherein
the attribute information includes at least one of a page for chapter division, a paper size, a paper type, color setting, and an image ratio.

16. A non-transitory computer readable medium storing a program causing a computer to execute information processing comprising:
receiving print data including a plurality of page images;
receiving data indicating a type of the print data for selecting attribute information, the attribute information including a degree of importance set for each attribute indicating a feature of the page image;
acquiring the attribute information according to the type of the print data;
setting an evaluation value for each of the page images included in the print data by using the acquired attribute information; and
displaying previews of the page images according to evaluation values, wherein
the evaluation values are based on the degree of importance, and
the degree of importance is changeable by changing the attribute information.

* * * * *